(12) United States Patent
Kundu et al.

(10) Patent No.: US 10,553,045 B2
(45) Date of Patent: Feb. 4, 2020

(54) COGNITIVE TESTING, DEBUGGING, AND REMEDIATION OF DRONE

(71) Applicant: INTERNATIONAL BUSINESS MACHINES CORPORATION, Armonk, NY (US)

(72) Inventors: Ashish Kundu, Elmsford, NY (US); Ruchi Mahindru, Elmsford, NY (US); Valentina Salapura, Yorktown Heights, NY (US); Manas R. Kumar Singh, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 68 days.

(21) Appl. No.: 15/909,728

(22) Filed: Mar. 1, 2018

(65) Prior Publication Data

US 2019/0272686 A1    Sep. 5, 2019

(51) Int. Cl.
  *G07C 5/08*  (2006.01)
  *B64C 39/02* (2006.01)

(52) U.S. Cl.
  CPC .......... *G07C 5/0808* (2013.01); *B64C 39/024* (2013.01)

(58) Field of Classification Search
  CPC ............................ G07C 5/0808; B64C 39/024
  USPC .......................................................... 701/3
  See application file for complete search history.

(56) References Cited

U.S. PATENT DOCUMENTS

| | | | |
|---|---|---|---|
| 5,240,207 A | 8/1993 | Eiband et al. | |
| 9,223,313 B2 | 12/2015 | Wolfe et al. | |
| 9,944,404 B1 * | 4/2018 | Gentry | G07C 5/0816 |
| 2015/0032297 A1 | 1/2015 | Loewen et al. | |
| 2015/0375765 A1 | 12/2015 | Mustard | |
| 2016/0140851 A1 * | 5/2016 | Levy | G08G 5/0069 701/3 |

FOREIGN PATENT DOCUMENTS

CN    102109418 A    6/2011

OTHER PUBLICATIONS

Gharibi, M.; Boutaba, R.; Waslander, S.L. "Internet of Drones", Access, IEEE, vol. 4, Mar. 2, 2016, pp. 1148-1162.

* cited by examiner

*Primary Examiner* — Marthe Y Marc-Coleman
(74) *Attorney, Agent, or Firm* — Conley Rose, P.C.

(57) ABSTRACT

A computer-implemented method includes obtaining fault information regarding a fault associated with a first drone. The computer-implemented method additionally includes obtaining context parameter data of the first drone. The computer-implemented method additionally includes, responsive to obtaining the fault information and the context parameter data, determining to apply a first test case of a plurality of test cases based on a first risk value determined for the first test case using the context parameter data. The first test case is associated with the fault. The computer-implemented method additionally includes causing the first drone to initiate execution of the first test case.

20 Claims, 7 Drawing Sheets

US 10,553,045 B2

COGNITIVE TESTING, DEBUGGING, AND REMEDIATION OF DRONE

BACKGROUND

The present disclosure relates to testing and debugging a drone. Testing software, hardware, or firmware on drones during use presents challenges because of factors such as geo-location, altitude, flying, wind conditions, and proximal traffic may pose risks to the drone.

SUMMARY

According to an embodiment of the present disclosure, a computer-implemented method includes obtaining fault information regarding a fault associated with a first drone. The computer-implemented method additionally includes obtaining context parameter data of the first drone. The computer-implemented method additionally includes, responsive to obtaining the fault information and the context parameter data, determining to apply a first test case of a plurality of test cases based on a first risk value determined for the first test case using the context parameter data. The first test case is associated with the fault. The computer-implemented method additionally includes causing the first drone to initiate execution of the first test case.

According to another embodiment of the present disclosure, a system includes a fault monitoring system configured to obtain fault information regarding a fault associated with a first drone. The system includes a test and debug system configured to obtain context parameter data of the first drone. The test and debug system is also configured to, responsive to obtaining the fault information and the context parameter data, determine to apply a first test case of a plurality of test cases based on a first risk value determined for the first test case using the context parameter data, wherein the first test case is associated with the fault. The test and debug system is further configured to cause the first drone to initiate execution of the first test case.

According to another embodiment of the present disclosure, a computer program product includes a computer readable storage medium having program instructions embodied therewith. The program instructions are executable by a computer to cause the computer to obtain fault information regarding a fault associated with a first drone. The program instructions are further executable by the computer to cause the computer to obtain context parameter data of the first drone. The program instructions are further executable by the computer to cause the computer to, responsive to obtaining the fault information and the context parameter data, determine to apply a first test case of a plurality of test cases based on a first risk value determined for the first test case using the context parameter data, wherein the first test case is associated with the fault. The program instructions are further executable by the computer to cause the first drone to initiate execution of the first test case.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

The illustrated figures are only exemplary and are not intended to assert or imply any limitation with regard to the environment, architecture, design, or process in which different embodiments may be implemented. Any optional component or steps are indicated using dash lines in the illustrated figures.

DETAILED DESCRIPTION

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to". Unless otherwise indicated, as used throughout this document, "or" does not require mutual exclusivity, and the singular forms "a", "an" and "the" are intended to include the plural forms as well, unless the context clearly indicates otherwise.

A module as referenced herein may comprise of software components such as, but not limited to, data access objects, service components, user interface components, application programming interface (API) components; hardware components such as electrical circuitry, processors, and memory; and/or a combination thereof. The memory may be volatile memory or non-volatile memory that stores data and computer executable instructions. The computer executable instructions may be in any form including, but not limited to, machine code, assembly code, and high-level programming code written in any programming language. The module may be configured to use the data to execute one or more instructions to perform one or more tasks.

Figure 1:
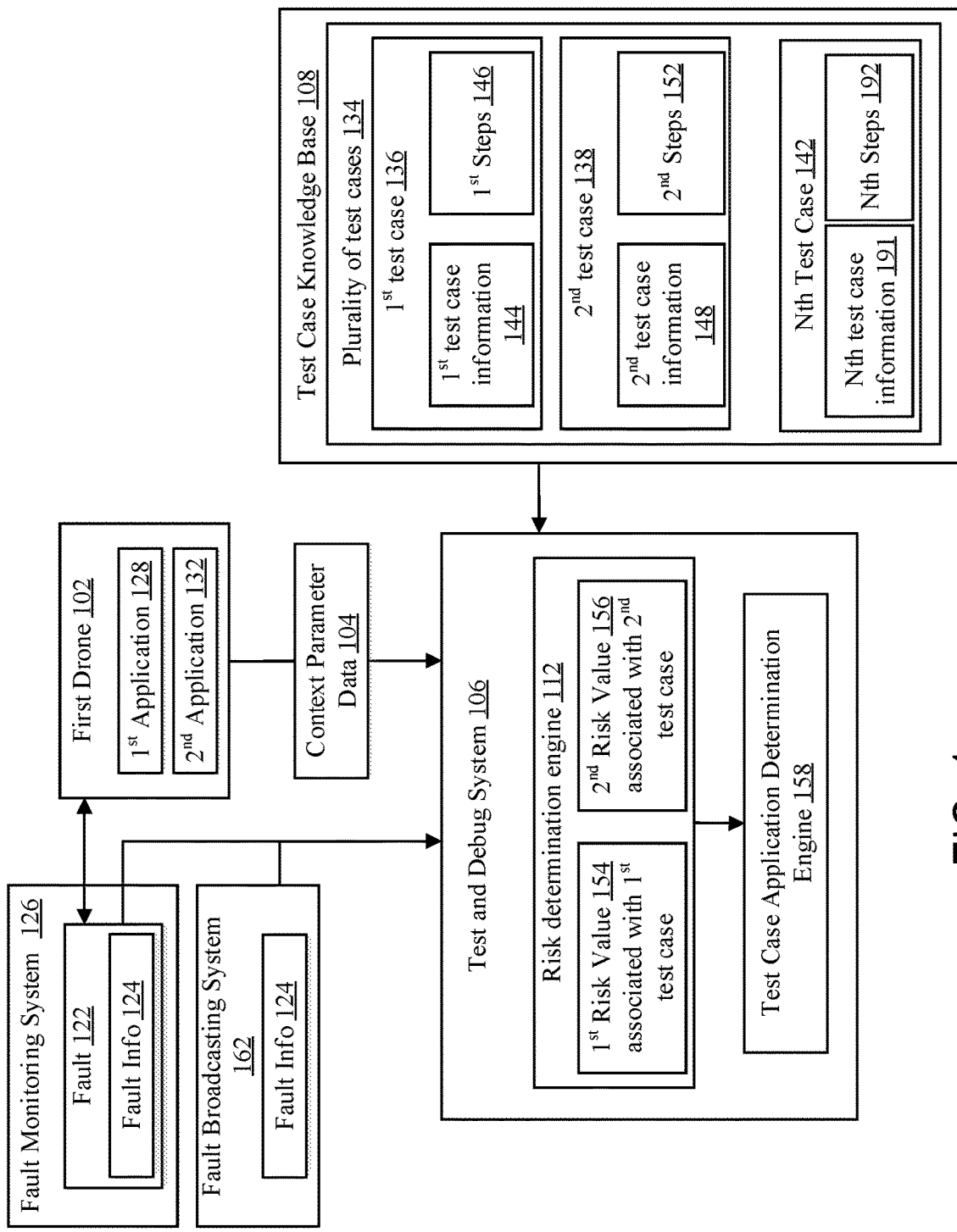
FIG. 1 shows an illustrative block diagram of a system configured to dynamically determine, based on context, to apply a test case to test an application of a drone.

The disclosed embodiments seek to provide testing, debugging, or remediation of a drone during flight (e.g., during a mission) based at least in part on context. With reference now to FIG. 1, a block diagram of a system 100 configured to dynamically test a first drone 102 based on context is illustrated. The system 100 includes a test and debug system 106. The test and debug system 106 may be implemented on the first drone 102 or may be implemented remotely from the first drone 102.

The system 100 includes a fault monitoring system 126. The fault monitoring system 126 may be co-located with, or on, the first drone 102 or may be remotely located from the first drone 102. The fault monitoring system 126 is configured to monitor the first drone 102 and operational and computing details of the first drone 102 in order to determine functional and operational health, as well as a computational health, of the first drone 102. The computational health of the first drone 102 refers to how computing processes on the first drone 102 are ongoing on various cores or processors on-board the first drone 102. The fault monitoring system 126 is configured to detect a fault 122 and generate fault information 124 regarding the fault 122. The test and debug system 106 is configured to obtain the fault information 124 regarding the fault 122 experienced by the first drone 102. Alternatively or additionally to the fault monitoring system 126, the system 100 includes a fault broadcasting system 162 to broadcast the fault information 124. The test and debug system 106 may receive the fault information 124 from the fault broadcasting system 162. In some examples, the fault broadcasting system 162 is a central service or a distributed service administered by the vendor of the drones, the vendor of software/firmware/hardware components of the drones, or an oversight entity. Additionally or alternatively, the central service may be supported by other participants, such as developers, industry customers, and/or regulators. Thus, the test and debug system 106 may obtain the fault information 124 from a fault monitoring system 126 that monitors the first drone or may obtain the fault information 124 from a fault broadcasting system 162 that broadcasts the fault information 124.

The system 100 includes a test case knowledge base 108. The test case knowledge base 108 includes a plurality of test cases 134. For example, the plurality of test cases 134 may include a first test case 136, a second test case 138, and an Nth test case 142. In some examples, a test case is a document, test script, or piece of code unit containing test data. A test case may include a set of test data, pre-conditions, expected results, and post-conditions, developed for a particular test scenario in order to verify compliance against a specific requirement. A test case acts as the starting point for the test execution, and after applying a set of input values, the application being tested has a definitive outcome and leaves the system at some end point (also known as execution post-condition). Each of the plurality of test cases 134 includes test case information and one or more steps that are executed by an associated application during application of the test case. For example, the first test case 136 may include first test case information 144 and first steps 146, the second test case 138 may include second test case information 148 and second steps 152, and the Nth test case 142 may include Nth test case information 191 and Nth steps 192.

The test case information may include required conditions for testing. For example, the first test case information 144 may include first required conditions for testing the first drone 102 using the first test case 136, the second test case information 148 includes second required conditions for testing the first drone 102 using the second test case 138, and the Nth test case information 191 includes Nth required conditions for testing the first drone 102 using the Nth test case 142. The required conditions for testing may correspond to a context vector. For example, the required conditions may indicate preconditions associated with the test case. In some examples, the preconditions include a geographical area based on a regulation establishing a geographical zone the first drone 102 is allowed to operate in. As another example, the preconditions may include an altitude, flight route, location of flying, speed of rotor blades, etc. that the first drone 102 must achieve prior to or during the testing.

In some examples, the test case information additionally includes known issues associated with the test cases. For example, the first test case information 144 may include known issues associated with the first test case 136, the second test case information 148 may include known issues associated with the second test case 138, and the Nth test case information 191 may include known issues associated with the Nth test case 142.

The plurality of test cases 134 may be generated and applied to reproduce associated bugs during debugging to identify a bug associated with a fault. A fault may be associated with a group of test cases that may be referred to as a test plan. For example, a first fault with a first application 128 of the first drone 102 may be associated with a first plurality of test cases (e.g., the first test case 136 and the second test case 138) in a first test plan, a second fault with the first application 128 may be associated with a second plurality of test cases in a second test plan, a first fault with a second application 132 of the first drone 102 may be associated with a third plurality of test cases in a third test plan. In the examples below, for illustration purposes, the first test case 136 and the second test case 138 are treated as being related to the fault 122.

The test and debug system 106 is also configured to obtain context parameter data 104 of the first drone 102. The context parameter data 104 includes context information regarding the first drone 102. For example, the context parameter data 104 may include weather conditions in an area in which the first drone 102 is flying, landscape in the area, wind speed in the area, drone traffic in the area, a current condition of one or more components of the first drone 102, or a combination thereof. In some examples, the first drone 102 includes one or more sensors to determine one or more context parameters of the context parameter data 104. The context parameter data 104 may additionally include known issues associated with the test cases as described below in more detail with reference to first test case information 144, second test case information 148, and Nth test case information.

The test and debug system 106 is configured to obtain, from the test case knowledge base 108, the test case information (including the required conditions and/or issues associated with the test case) of test cases associated with a fault. In an example in which the first test case 136 and the second test case 138 are associated with the fault 122, the test and debug system 106 is configured to obtain, from the test case knowledge base 108 and responsive to detecting the fault 122, the first test case information 144 and the second test case information 148.

The test and debug system 106 includes a risk determination engine 112 configured to determine a first risk value 154 associated with executing the first test case 136. The risk determination engine 112 is configured to determine the first risk value 154 based on the context parameter data 104 and the required conditions in the first test case information 144 obtained from the test case knowledge base 108. In some examples, in which the test and debug system 106 obtains known issues associated with the first test case 136, the first risk value 154 is determined using the known issues. The first risk value 154 indicates a risk associated with execution of the first test case 136 given the context information from the context parameter data 104.

In some examples, the test and debug system 106 is additionally configured to determine a second risk value 156 for the second test case 138 based on the context parameter data 104 and the required conditions in the second test case information 148 obtained from the test case knowledge base 108. In some examples, in which the test and debug system 106 obtains known issues associated with the second test case 138, the second risk value 156 is further determined based on the known issues. The second risk value 156 indicates a risk associated with execution of the second test case 138 given the context information from the context parameter data 104. In some examples, the test and debug system 106 determines the second risk value 156 prior to determining to apply the first test case 136, and uses the first risk value 154 and the second risk value 156 to determine which of the first test case 136 or the second test case 138 to apply in response to the fault 122. In other examples, the first test case 136 is applied prior to the second test case 138, and the second test case 138 is only applied in response to the fault 122 when application of the first test case 136 fails to sufficiently indicate the problem. In these examples, the risk determination engine determines the second risk value after application of the first test case 136.

The test and debug system 106 includes a test case application determination engine 158 configured to determine whether to apply the first test case 136 based on the first risk value 154. In some examples, the test and debug system 106 compares the first risk value 154 to a pre-determined allowed risk value indicating a maximum risk, and determines to apply the first test case 136 when the first risk value 154 satisfies (e.g., is less than) the pre-determined allowed risk value.

In some examples, the test case application determination engine 158 is configured to determine whether to apply the first test case 136 or a different test case (e.g., the second test case 138) associated with the fault 122 based on the first risk value 154 and the second risk value 156 associated with the second test case 138. For example, the test case application determination engine 158 may be configured to compare the first risk value 154 and the second risk value 156 to determine which of the first risk value 154 and the second risk value 156 is associated with a lower risk (e.g., which of the first risk value 154 and the second risk value 156 is lowest).

The test and debug system 106 is configured to cause the first drone 102 to initiate execution of the first test case 136. For example, after selecting the first test case 136, the test and debug system 106 is configured to push the first test case 136 to the first drone 102. In some examples, upon receiving the push from the test and debug system 106, the application (e.g., the first application 128) of the first drone 102 executes the first steps 146 in the first test case 136 and reports results to a remediation action selector, such as the remediation action selector 408 of FIG. 4. Based on the results of execution of the first test case 136, the remediation action selector determines one or more confidence and risk values for remediation actions relevant to the results and determines a remediation action based on the confidence and risk values. For example, when the first test case 136 successfully identifies the problem, the remediation action may include debugging the application based on the results from the first test case 136 when the confidence and risk values of debugging satisfy confidence and risk value thresholds. As another example, the remediation action may include performing additional test cases. Alternatively or additionally, the remediation action may include restarting a component (such as an engine), returning to base, sending another drone to test, patching, rolling back, or a combination thereof, as described in more detail below with reference to FIG. 4. Thus, the system 100 determines a test case to apply to the first drone 102 based on context information.

Figure 2:
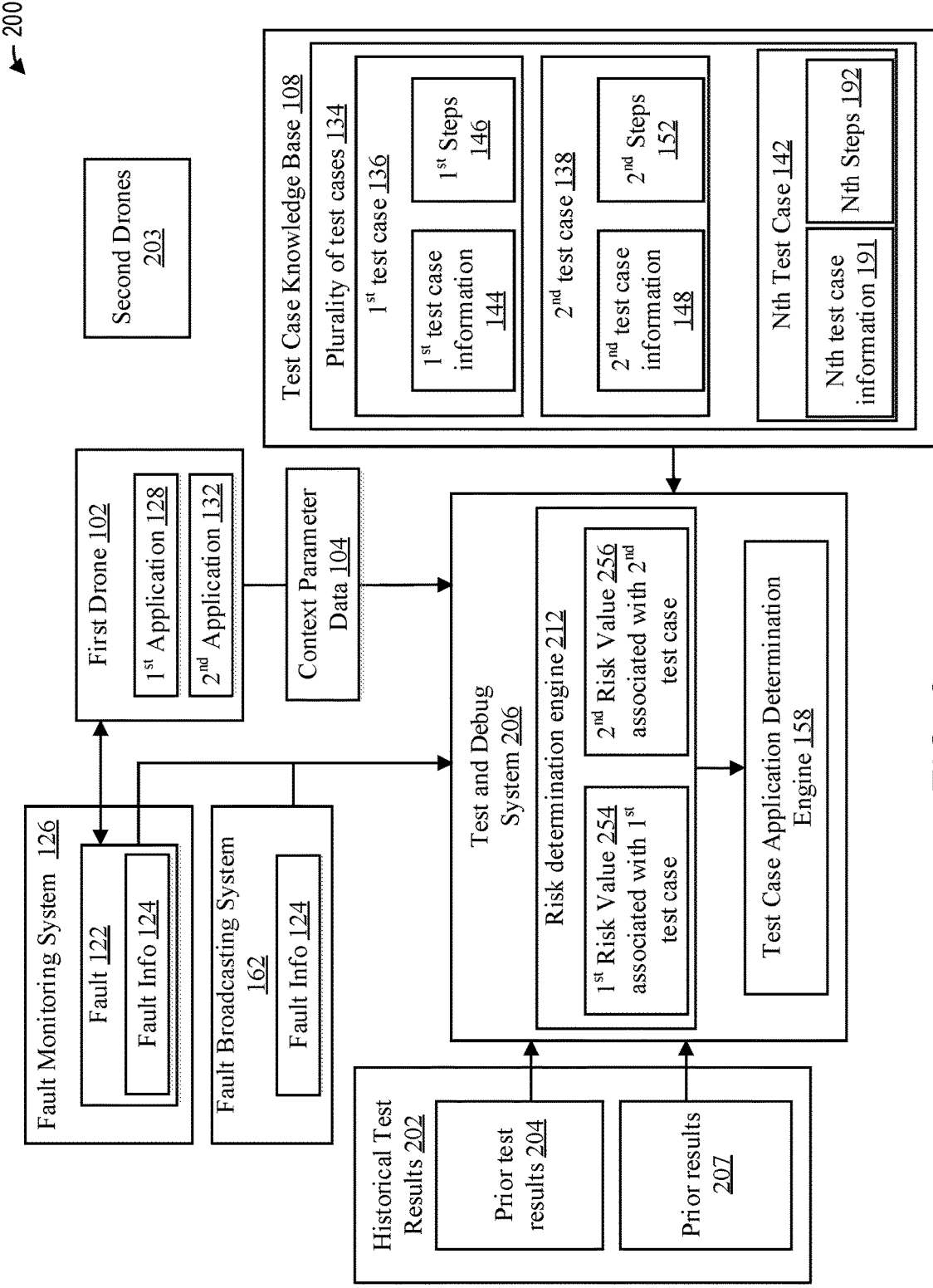
FIG. 2 shows an illustrative block diagram of a system configured to dynamically determine, based on context and historical results, to apply a test case to test an application of a drone.

With reference now to FIG. 2, a block diagram of a system 200 configured to dynamically test a first drone 102 based on context and historical test results 202 is illustrated. In FIG. 2, the same components to FIG. 1 are indicated using the same reference number. For example, the test case knowledge base 108 of FIG. 2 corresponds to and is configured to operate as described above with reference to FIG. 1, the first drone 102 of FIG. 2 corresponds to and is configured to operate as described above with reference to FIG. 1, and the fault monitoring system 126 of FIG. 2 corresponds to and is configured to operate as described above with reference to FIG. 1. The historical test results 202 include prior test results 204 of the first test case 136 on other drones (e.g., second drones 203) and prior test results 207 of other test cases in a test plan that includes the first test case 136. A test and debug system 206 is configured to obtain the historical test results 202 including prior test results 204 of the first test case 136 on other drones and prior test results 207 of other test cases in a test plan that includes the first test case 136.

The test and debug system 206 includes a risk determination engine 212 configured to determine a first risk value 254 associated with executing the first test case 136. The risk determination engine 212 determines the first risk value 254 based on the context parameter data 104, the required conditions in the first test case information 144 obtained from the test case knowledge base 108, and the historical test results 202. In examples in which the test and debug system 206 obtains known issues associated with the first test case 136, the first risk value 254 is further determined based on the known issues. The first risk value 254 indicates a risk associated with execution of the first test case 136 given the context information from the context parameter data 104, the required conditions associated with the first test case 136, and the historical test results 202.

In some examples, the test and debug system 206 is additionally configured to determine a second risk value 256 for the second test case 138 based on the context parameter data 104, the required conditions in the first test case information 144 obtained from the test case knowledge base 108, and the historical test results 202. In examples in which the test and debug system 206 obtains known issues associated with the second test case 138, the second risk value 256 is further determined based on the known issues. The second risk value 256 indicates a risk associated with execution of the second test case 138 given the context information from the context parameter data 104, the required conditions associated with the second test case 138, and the historical test results 202. In some examples, the test and debug system 206 determines the second risk value 256 prior to determining to apply the first test case 136, and uses the first risk value 254 and the second risk value 256 to determine which of the first test case 136 or the second test case 138 to apply in response to the fault 122. In other examples, the first test case 136 is applied prior to the second test case 138, and the second test case 138 is only applied in response to the fault 122 when application of the first test case 136 fails to sufficiently indicate the problem. In these examples, the risk determination engine 212 determines the second risk value 256 after application of the first test case 136.

The test and debug system 206 includes a test case application determination engine 158 configured to determine whether to apply the first test case 136 based on the first risk value 254. In some examples, the test case application determination engine 158 of FIG. 2 compares the first risk value 254 to a pre-determined allowed risk value indicating a maximum risk, and selects the first test case 136 when the first risk value 254 satisfies (e.g., is less than) the pre-determined allowed risk value.

In some examples, the test case application determination engine 158 is configured to determine whether to apply the first test case 136 or a different test case (e.g., the second test case 138) associated with the fault 122 based on the first risk value 254 associated with the first test case 136 and the second risk value 256 associated with the second test case 138. For example, the test case application determination engine 158 may be configured to compare the first risk value 254 and the second risk value 256 to determine which of the first risk value 254 and the second risk value 256 is associated with a lower risk (e.g., which of the first risk value 254 and the second risk value 256 is lowest).

The test and debug system 206 is configured to cause the first drone 102 to initiate execution of the first test case 136. For example, after selecting the first test case 136, the test and debug system 206 is configured to push the first test case 136 to the first drone 102. In some examples, upon receiving the push from the test and debug system 206, the application (e.g., the first application 128) of the first drone 102 executes the steps in the first test case 136 and reports results to a remediation action selector, such as the remediation action selector 408 of FIG. 4. Based on the results of execution of the first test case 136, the remediation action selector determines a remediation action. For example, when the first test case 136 successfully identifies the problem, the remediation action may include debugging the application (e.g., the first application 128) based on the results from the first test case 136. As another example, the remediation action may include performing additional test cases. Alternatively or additionally, the remediation action may include restarting a component (such as an engine), returning to base, sending another drone to test, patching, rolling back, or a combination thereof, as described in more detail below with reference to FIG. 4. Thus, the system 200 determines a test case to apply to the first drone 102 based on context information as well as historical test results.

Figure 3:
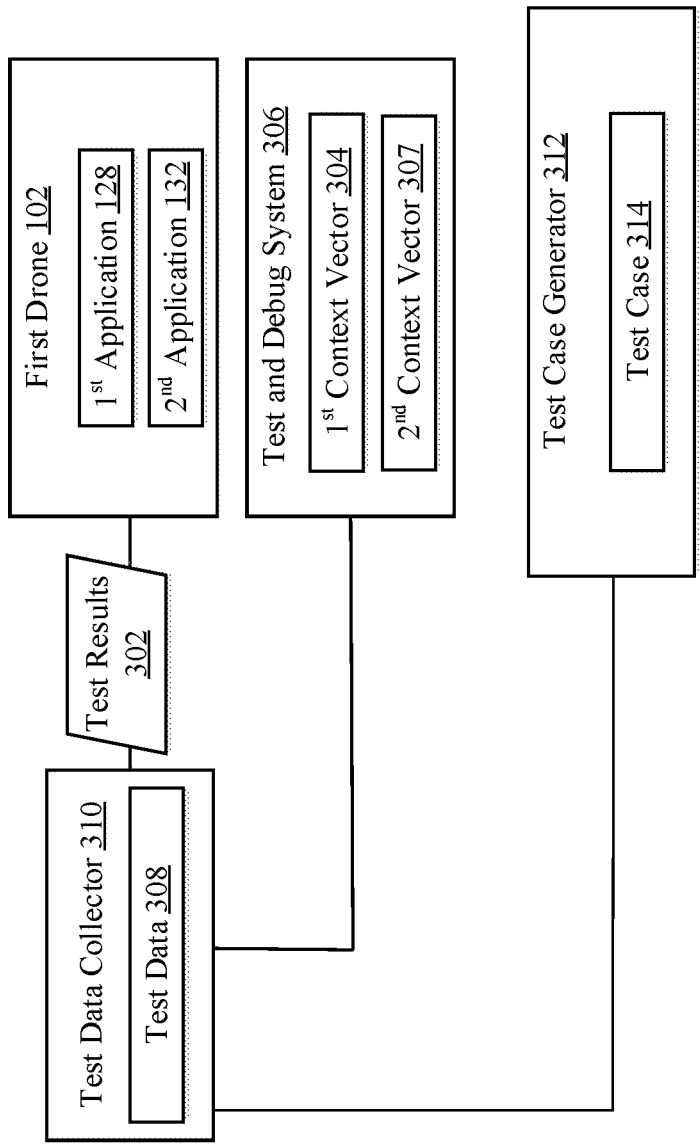
FIG. 3 shows an illustrative block diagram of a system configured to dynamically test a first drone and to generate one or more test cases to test the first drone is illustrated.

With reference now to FIG. 3, a block diagram of a system 300 configured to dynamically test a first drone 102 and to generate or modify one or more test cases to test the first drone 102 is illustrated. The system 300 includes a test and debug system 306. The test and debug system 306 may be configured to determine to apply the first test case 136 of FIGS. 1 and 2 as described above with reference to FIG. 1 or 2. For example, the test and debug system 306 may include the risk determination engine 112 of FIG. 1 or the risk determination engine 212 of FIG. 2 and may additionally include the test case application determination engine 158 of FIGS. 1 and 2. The system 300 may also include the test case knowledge base 108 of FIGS. 1 and 2, the fault monitoring system 126 of FIGS. 1 and 2, and/or the fault broadcasting system 162 of FIGS. 1 and 2.

The system 300 includes a test data collector 310 configured to gather test data 308 from the first drone 102 and/or from the test and debug system 106. In some examples, the first drone 102 provides the test data collector 310 test results 302 of application of the first test case 136 and/or the second test case 138 described with reference to FIGS. 1 and 2. Additionally or alternatively, the test and debug system 306 provides the test data collector 310 context vector information associated with application of the first test case 136 or the second test case 138. For example, the test and debug system 306 may be configured to provide the test data collector 310 with a first context vector 304 and/or a second context vector 307. The first context vector 304 may indicate the context parameter data 104 associated with the first test case 136 when the first test case 136 is applied. To illustrate, the first context vector 304 may indicate weather conditions in an area in which the first drone 102 is flying during execution of the first test case 136, landscape in the area of the first drone 102 at the time of application of the first test case 136, wind speed in the area of the first drone 102 at the time of application of the first test case 136, drone traffic in the area of the first drone 102 at the time of application of the first test case 136, a current condition of one or more components of the first drone 102 at the time of application of the first test case 136, or a combination thereof. As another example, the second context vector 307 may indicate the context parameter data 104 associated with the second test case 138 when the second test case 138 is applied.

The system 300 includes a test case generator 312 configured to dynamically generate one or more test cases based on the test data 308. For example, the test case generator 312 may learn which context vectors the first test case 136 succeeds in, and may modify the first test case information 144 to generate a test case 314 that reflects that the first test case 136 is to be applied in conditions based on the context vectors in which the first test case 136 has succeeded. Thus, the system 300 of FIG. 3 generates or modifies a test case based on which context vectors one or more test cases succeed in.

Figure 4:
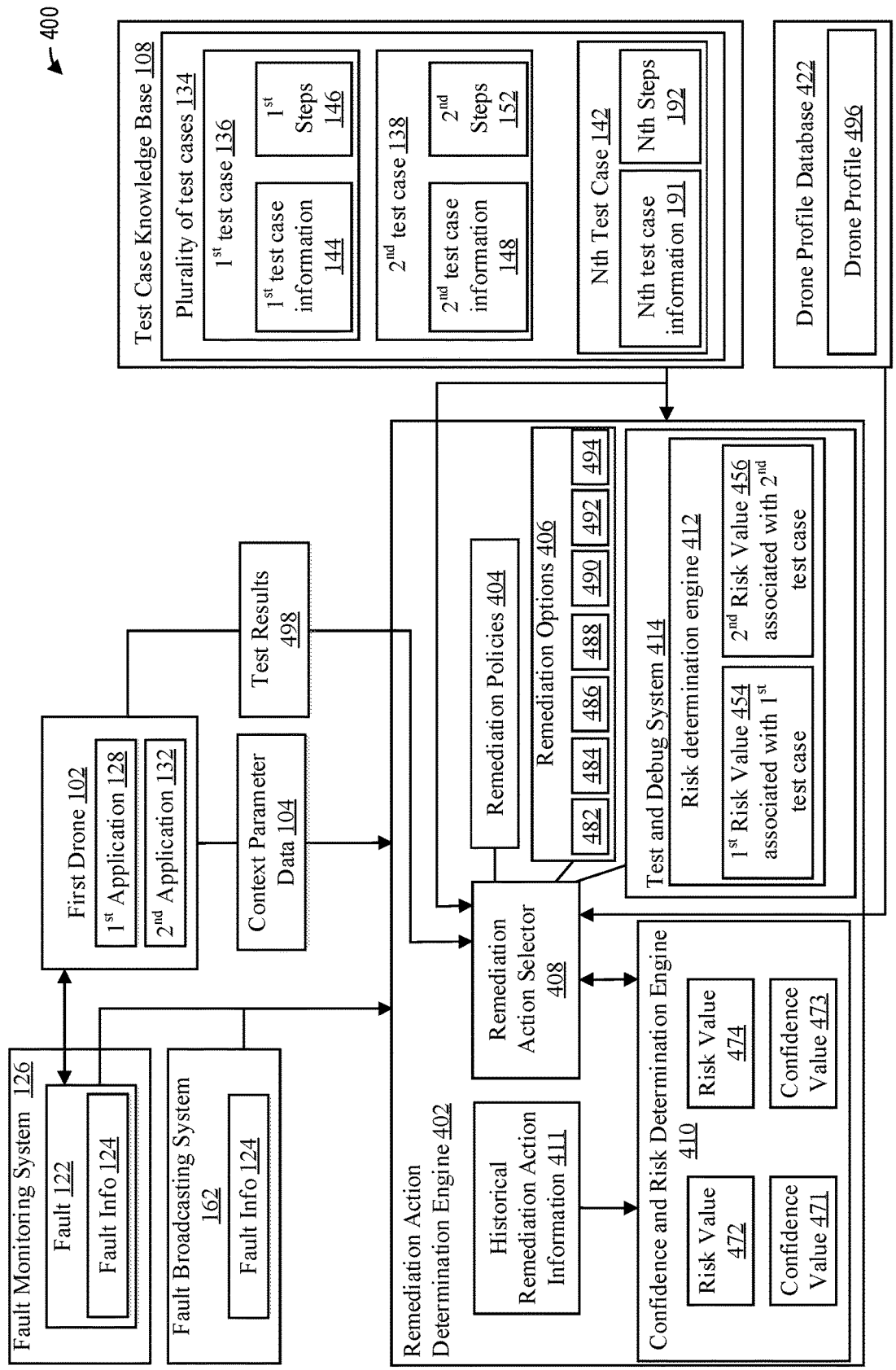
FIG. 4 shows an illustrative block diagram of a system configured to dynamically apply one or more remediation actions to a first drone based on context.

Referring to FIG. 4, a system 400 for dynamically determining a remediation action for a first drone 102 based on context is illustrated. In FIG. 4, similar components to FIGS. 1 and 2 are indicated using the same reference number. For example, the test case knowledge base 108 of FIG. 4 corresponds to and is configured to operate as described above with reference to FIG. 1 or 2, the first drone 102 of FIG. 4 corresponds to and is configured to operate as described above with reference to FIG. 1 or 2, the fault monitoring system 126 of FIG. 4 corresponds to and is configured to operate as described above with reference to FIG. 1 or 2, and the fault broadcasting system 162 corresponds to and is configured to operate as described above with reference to FIG. 1 or 2. The system 400 includes a remediation action determination engine 402. The remediation action determination engine 402 stores remediation policies 404 and is configured to determine a remediation action responsive to the fault 122 and according to the remediation policies 404.

The remediation action determination engine 402 also stores remediation options 406. The remediation options 406 may include a first remediation option 482 to perform one or more test cases if a fault is unknown, regulations are satisfied, and risks satisfy remediation policy allowances. In this example, the remediation action determination engine 402 may query a test and debug system 414 for test cases and associated risk values determined based on context. In some examples, the test and debug system 414 is configured to function as described above with reference to the test and debug system 106 of FIG. 1 or 206 of FIG. 2. To illustrate, the test and debug system 414 may determine test cases related to the fault 122, may determine, using a risk determination engine 412, one or more risk values (e.g., a first risk value 454 and/or a second risk value 456) associated with the test cases using the context parameter data 104, the required conditions from the test case information 144 and/or 148, the known issues associated with the first test case 136, and/or the historical results 202 as described above with reference to the risk determination engine 112 or 212 of FIGS. 1 and/or 2.

Additionally or alternatively, the remediation options 406 may include a second remediation option 484 that includes restarting a component of the first drone 102 if the risk determination engine 410 determines that the component can be restarted within policy allowances (risk within policy allowances). For example, the risk determination engine 410 may determine a risk value for restarting a component associated with the fault 122 by determining a likelihood that the first drone 102 can fly with threshold amount of stability if the component is restarted. In some examples, the component is restarted individually. In other examples, the component is restarted by restarting an engine, which restarts the component.

In some examples, the remediation options 406 include a third remediation option 486 that includes using or deploying one or more backup drones. For example, the remediation options 406 may include a drone selection policy for remediation to select a drone to take over a mission of the first drone 102. The first drone 102 is then released from the mission and enters safe mode in case of a fatal problem. If the first drone 102 cannot be recovered, then the first drone 102 is destroyed.

In some examples, the remediation options 406 include a fourth remediation option 488 that includes rolling back affected software to a previous version of software or pushing a software upgrade. In some examples, the remediation options 406 include a fifth remediation option 490 that includes applying a patch. In some examples, the remediation options 406 include a sixth remediation option 492 that includes discontinuing the mission being executed by the first drone 102. In some examples, the remediation options 406 include a seventh remediation option 494 that involves launching another drone to perform test cases on. Although the remediation options 406 are illustrated as including seven remediation options, in other examples, the remediation options 406 include fewer than or more than seven remediation options.

In some examples, the system 400 additionally includes a drone profile database 422 that stores a drone profile 496 of the first drone 102 as well as drone profiles of other drones. The drone profile database 422 may be located at a base station. The drone profile 496 and the drone profiles of the other drones may indicate drone functionality and types of test cases, and may be updated based on various factors such as patch level, travel time, maps travelled, altitude, and test polygons (e.g., area where the drone has been/may be tested).

The remediation action determination engine includes a remediation action selector 408 and a confidence and risk determination engine 410 coupled to the remediation action selector 408. The remediation action selector 408 is coupled to the remediation options 406 and the remediation policies 404 and is configured to receive test results 498 of application of one or more test cases (e.g., the first test case 136 and/or the second test case 138). The remediation action selector 408 is configured to selectively cause the confidence and risk determination engine 410 to determine one or more risk values (e.g., first and second risk values 472, 474) and one or more confidence values (e.g., first and second confidence values 471, 473) for one or more of the remediation options 406 based on context (e.g., based on the context parameter data 104), based on historical remediation actions information 411, based on the drone profile 496, based on human feedback, or a combination thereof. The historical remediation actions information 411 may include historical data regarding the remediation actions and rate of faults associated with post remediation action.

To illustrate, the historical remediation actions information 411 may include historical data regarding the second remediation option 484 that indicates context (e.g., weather, location, drone parameters) in which application of the second remediation option 484 was successful for other drones, context in which application of the second remediation option 484 was unsuccessful for other drones, rate and type of fault or failure during application of the second remediation option 484 by other drones, rate of fault post application of the second remediation option 484 to other drones, or a combination thereof. For example, the historical remediation actions information 411 may indicate context vectors in which application of the second remediation option 484 was successful, context vectors in which application of the second remediation option 484 was unsuccessful, the rate and type of fault during unsuccessful application of the second remediation option 484, and the rate of fault of post application of the second remediation option 484. The confidence and risk determination engine 410 may process the context vectors and rate and type information in view of the context parameter data 104 to determine a risk value and a confidence value for the second remediation option 484.

The one or more remediation options 406 for which the one or more confidence values 471, 473 and the one or more risk values 472, 474 are determined may be based on the test results 498. For example, if the test results 498 of application of the first test case 136 indicate that the problem with the fault is a first problem, the confidence and risk determination engine 410 may determine confidence and risk values for the second remediation option 484 and the fourth remediation option 488 based on the remediation policies 404 indicating that the second remediation option 484 and the fourth remediation option 488 are remediation options available responsive to the first problem.

In an example, the remediation action selector 408 may be configured to determine whether the problem associated with the fault 122 is known. When the problem associated with fault 122 is unknown, the remediation action selector 408 may instruct the risk determination engine 412 to determine one or more of the risk values (e.g., the first risk value 454 and/or the second risk value 456) associated with test cases related to the fault 122 as described above with reference to FIGS. 1-3. The one or more risk values (e.g., the first risk value 454 and/or the second risk value 456) associated with the related test cases are provided to the remediation action selector 408, which is configured to determine whether to apply a test case, and which test case to apply based on the one or more risk values 454 and/or 456 and the remediation policies 404.

In another example, when the problem is known, the remediation action selector 408 may be configured to cause the confidence and risk determination engine 410 to determine confidence and risk values associated one or more of the remediation options 406 (e.g., other than the first remediation option 482). For example, the confidence and risk determination engine 410 may be configured to determine the confidence and risk values associated with one or more of the remediation options 484, 486, 488, 490, 492, or 494 based on the context parameter data 104 and based on information associated with the remediation options 484, 486, 488, 490, 492, or 494 (e.g., the historical remediation actions information 411). For example, the remediation options 406 may include restarting a component as described above, and the confidence and risk determination engine 410 may determine a confidence and risk value associated with restarting the component based on the historical remediation actions information 411, the context data 104, and/or human feedback. As another example, the remediation options 406 may include selecting a drone for remediation. In this example, the confidence and risk determination engine 410 may determine a confidence value and a risk value associated with continuing the mission with the first drone 102 and a confidence and risk value associated with sending a second drone to take over the mission of the first drone 102. The remediation action selector 408 may then determine whether to continue the mission with the first drone 102 or to send a second drone to take over the mission based on whether the confidence value and the risk value associated with continuing the mission are greater than the confidence value and the risk value associated with sending the second drone to take over the mission.

In another example, when the problem is known, the remediation action determination engine 402 determines whether to push a software upgrade (e.g., a type of the fourth remediation option 488) or restart or reset specific propellers (e.g., a type of the second remediation option 484) based on the respective confidence and risk values associated with those options. Additionally or alternatively, the remediation action determination engine 402 may identify other drones with a similar profile to the first drone 102, and may send a patch to those drones to cause those drones to patch the vulnerability. When the problem is unknown, in this example the remediation action determination engine 402 may be configured to determine if the first drone 102 needs to be transitioned to a debug mode to perform one or more test cases (e.g., a type of the first remediation option 482). In this example, the remediation action determination engine 402 may be configured to select an alternative drone to take over the mission (e.g., a type of the third remediation option 486). In this example, the remediation action determination engine 402 may be configured to release the first drone 102 from its mission, cause the first drone 102 to enter a safe mode, and/or cause the first drone 102 to return or destroy the first drone 102 in order to not expose the technology or mission. Furthermore, in this example, the remediation action determination engine 402 may send off another drone to run test cases on (e.g., a type of the seventh remediation option 494).

Figure 5:
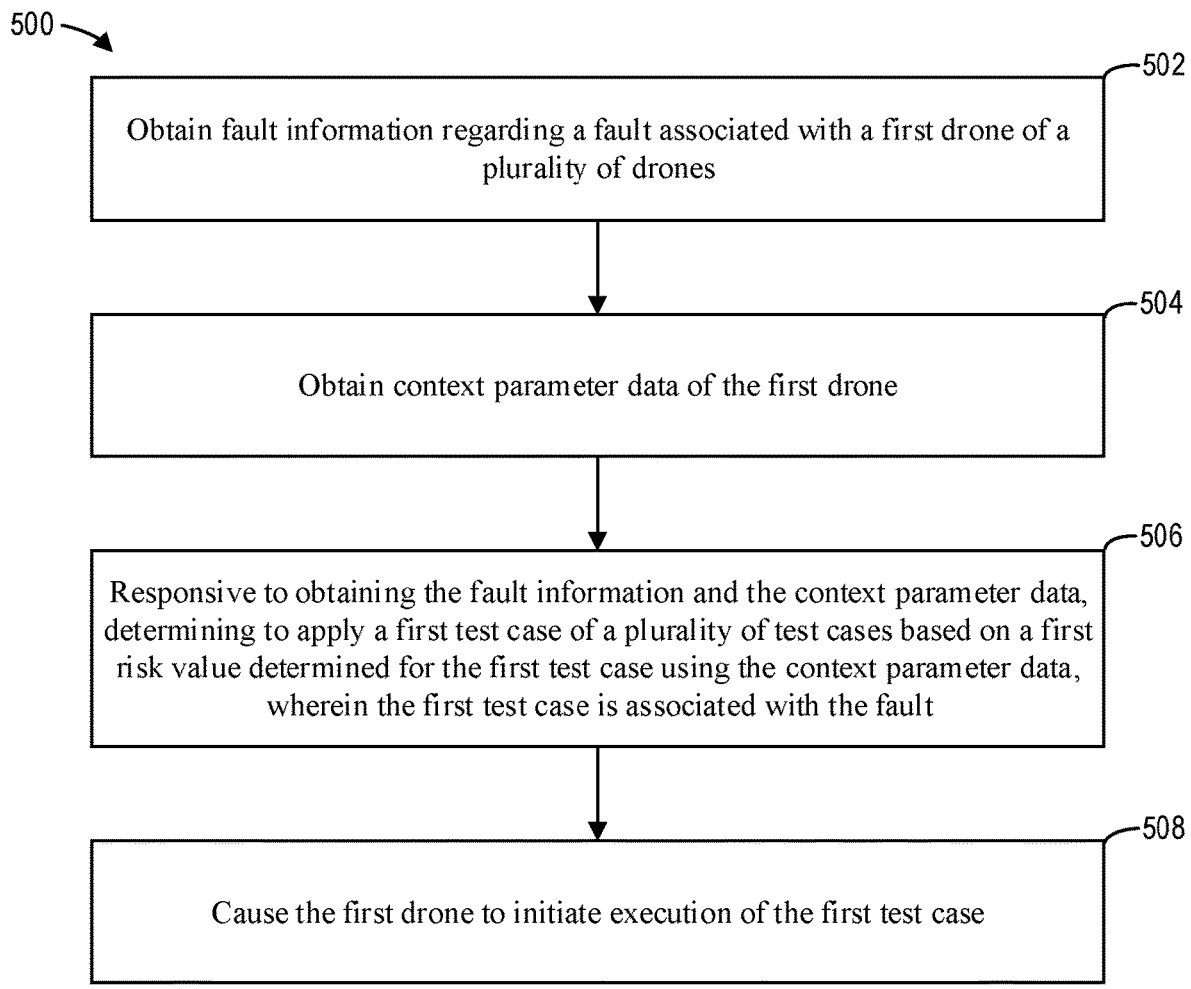
FIG. 5 shows a flowchart illustrating aspects of operations that may be performed in accordance with various embodiments.

With reference to FIG. 5, a computer-implemented method 500 of dynamically determining to apply a first test case is illustrated. The computer-implemented method 500 may be performed by one or more components of the system 100 of FIG. 1, one or more components of the system 200 of FIG. 2, one or more components of the system 300 of FIG. 3, or one or more components of the system 400 of FIG. 4. For example, the computer-implemented method 500 may be performed by the test and debug system 106 of FIG. 1, the test and debug system 206 of FIG. 2, the test and debug system 306 of FIG. 3, and/or the test and debug system 414 of FIG. 4. In some examples, the computer-implemented method 500, or a portion thereof, is performed by the first drone 102. For example, as described above, in some implementations the fault monitoring system, the test and debug system, or both, are implemented on the first drone 102. In other examples, as described above, the fault monitoring system, the test and debug system, or both, are implemented remotely from the first drone 102.

The computer-implemented method 500 includes obtaining, at 502, fault information regarding a fault associated with a first drone. For example, the fault may correspond to the fault 122 described above with reference to FIGS. 1-3. In some examples, obtaining the fault information at 502 includes receiving the fault information from the first drone 102. In this example, the first drone includes a fault monitoring system that monitors the first drone, detects the fault, and generates the fault information as described above with reference to FIG. 1. In this example, the first drone transmits the fault information to the test and debug system 106 of FIG. 1, the test and debug system 206 of FIG. 2, the test and debug system 306 of FIG. 3, or the test and debug system 414 of FIG. 4. In some examples, obtaining the fault information at 502 includes receiving the fault information from a system remote from the first drone 102. In these examples, the fault monitoring system is remotely located from the first drone, and the fault monitoring system monitors the first drone, detects the fault, and generates the fault information as described above with reference to FIG. 1. In this example, the fault monitoring system that is remote from the first drone transmits the fault information to the test and debug system 106 of FIG. 1, the test and debug system 206 of FIG. 2, the test and debug system 306 of FIG. 3, or the test and debug system 414 of FIG. 4.

The computer-implemented method 500 additionally includes obtaining, at 504, context parameter data of the first drone. The context parameter data may correspond to the context parameter data 104 described above with reference to FIGS. 1-4. In some examples, the context parameter data includes weather conditions in an area in which the first drone is flying, landscape in the area, wind speed in the area, drone traffic in the area, or a combination thereof. In some examples, the context parameters include a current condition of one or more components of the drone.

The computer-implemented method 500 additionally includes, responsive to obtaining the fault information and the context parameter data, determining, at 506, to apply a first test case of a plurality of test cases based on a first risk value determined for the first test case using the context parameter data, wherein the first test case is associated with the fault. For example, the first risk value may correspond to the first risk value 154, 254, or 454 of FIG. 1, 2, or 4, respectively, and may be determined as described above with reference to FIG. 1, 2, or 4.

In some examples, the first test case is further selected (e.g., the first risk value is determined) based on results of application of the first test case to one or more second drones. For example, the results of application of the first test case to one or more second drones 203 may correspond to the prior test results 204 of FIG. 2, and the first risk value is further determined based on the results as described above with reference to FIG. 2.

In some examples, the first risk value is determined based on known issues associated with the first test case. For example, the test case knowledge base may provide test case information that includes known issues associated with test cases as described above with reference to FIG. 1, and the first risk value is determined based on the known issues as described above with reference to FIG. 1.

In some examples, the plurality of test cases are grouped in a test plan, and the first risk value is determined using results of application, to the first drone, of one or more other test cases in the test plan. For example, the plurality of test cases in a test plan may correspond to or include the first test case 136 and the second test case 138 of FIG. 2, and the results of application of one or more other test cases in the test plan corresponds to or includes the prior results 207 described above with reference to FIG. 2. In these examples, the first test case 136 is selected further based on the prior results 207 as described above with reference to FIG. 2.

In some examples, determining to apply includes selecting the first test case from a plurality of test cases that include a second test case associated with the fault based on the first risk value being greater than a second risk value associated with the second test case. For example, the second test case may correspond to the second test case 138 of FIGS. 1-4, and the second risk value may correspond to the second risk value 156, 256, or 456 of FIG. 1, 2, or 4, respectively. In these examples, the second risk value may be determined (e.g., by the risk determination engine 112, 212, or 412 of FIG. 1, 2, or 4) as described above with reference to FIG. 1, 2, or 4.

The computer-implemented method 500 includes causing, at 508, the first drone to initiate execution of the first test case. For example, after selecting the first test case, the test and debug system 106 of FIG. 1, the test and debug system 206 of FIG. 2, the test and debug system 306 of FIG. 3, or the test and debug system 414 of FIG. 4 is configured to push the first test case to the first drone 102. In some examples, upon receiving the push from the test and debug system 106 of FIG. 1, the test and debug system 206 of FIG. 2, the test and debug system 306 of FIG. 3, or the test and debug system 414 of FIG. 4, the application of the first drone 102 executes the steps in the first test case and reports the data to a remediation action selector, such as the remediation action selector 408 of FIG. 4. Based on the results of execution of the test case, the remediation action selector determines a remediation action. For example, the remediation action may include performing additional test cases. Alternatively, the remediation action may include restarting a component (such as an engine), returning to base, sending another drone to test, patching, rolling back, or a combination thereof, as described in more detail above with reference to FIG. 4.

Figure 6:
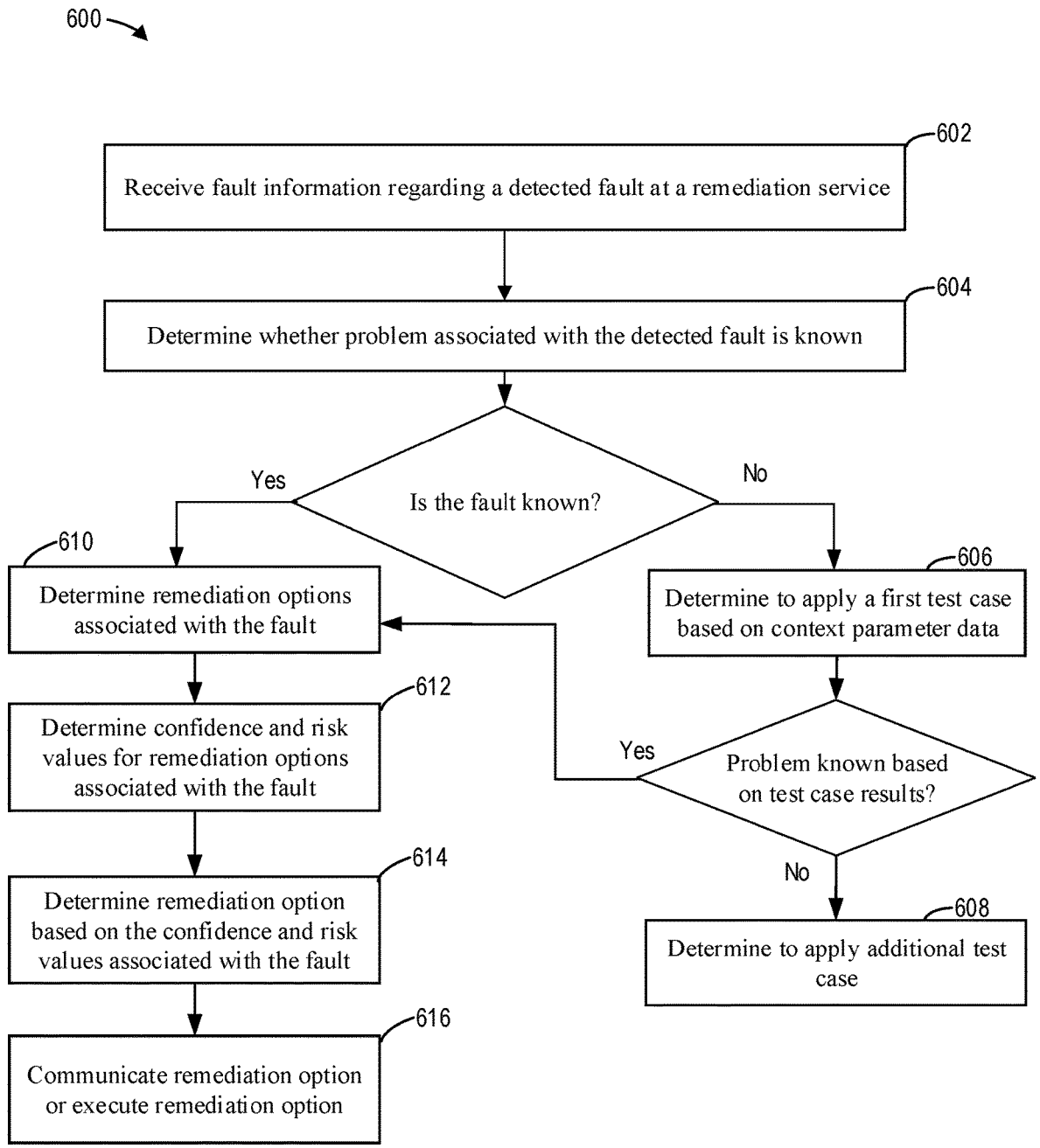
FIG. 6 shows a flowchart illustrate aspects of operations that may be performed in accordance with various embodiments.

With reference to FIG. 6, a computer-implemented method 600 of determining a remediation action is illustrated. The computer-implemented method 600 may be performed by the first drone 102 of FIG. 4 and/or the remediation action determination engine 402. The computer-implemented method 600 includes obtaining fault information regarding a detected fault on the first drone. For example, the fault monitoring system 126 of FIG. 4 may provide the fault information 124 regarding the fault 122 to the remediation action determination engine 402. In some examples, the remediation action determination engine 402 is on the first drone 102. In other examples, the remediation action determination engine 402 is located remotely from the first drone 102. When the remediation action determination engine 402 is located remotely from the first drone 102, the first drone transmits (e.g., via a transceiver) the fault information 124 to the remediation action determination engine 402, and the remediation action determination engine 402 obtains the fault information 124 by receiving the fault information via a transceiver.

The computer-implemented method 600 additionally includes determining, at 604, whether a problem associated with the fault 122 is known. When the fault is unknown, the computer-implemented method 600 includes determining, at 606, to apply a first test case based on context parameter data. For example, when the problem associated with the fault 122 is unknown, the remediation action selector 408 of FIG. 4 may instruct the test and debug system 414 of FIG. 4 to determine risk values associated with test cases associated with the fault based on context parameter data 104 and/or other information as described above with reference to FIGS. 1-4. The remediation action selector 408 may analyze the confidence and risk values associated with the test cases associated with the fault and select a test case (e.g., a first test case) that has the highest confidence value and the lowest risk value. In some examples, when none of the test cases associated with the fault satisfy a threshold risk value, an alternative action (e.g., such as returning to base) is implemented.

The computer-implemented method 600 additionally includes determining, at 608, to apply an additional test case when the problem is known based on test case results of application of the first test case. When the problem associated with the fault 122 is known, the computer-implemented method 600 includes determining, at 610, remediation options associated with the fault 122 (or the problem associated with the fault 122). For example, with reference to FIG. 4, the remediation action selector 408 may determine that the second option 484 of FIG. 4 and the third option 486 of FIG. 4 are remediation options associated with the fault 122 (or the problem associated with the fault 122). The computer-implemented method 600 additionally includes determining, at 612, confidence and risk values for the remediation options associated with the fault 122. For example, the confidence and risk values may be determined for each of the remediation options associated with the fault 122 based on context parameter data 104, historical remediation actions information 411, remediation policies 404, human feedback, and/or drone profile 496 information as described above with reference to FIG. 4. The computer-implemented method 600 additionally includes determining, at 614, a remediation option associated with the fault 122 based on the confidence and risk values of the remediation options associated with the fault. For example, the remediation action selector 408 may select the remediation option with the highest confidence value and/or the lowest risk value. The computer-implemented method 600 includes communicating, at 616, the selected remediation option to the first drone when the remediation action determination engine 402 is remotely located from the first drone. Alternatively or additionally, the computer-implemented method includes executing, at 616, the remediation option when the remediation action determination engine 402 is located on the first drone.

Figure 7:
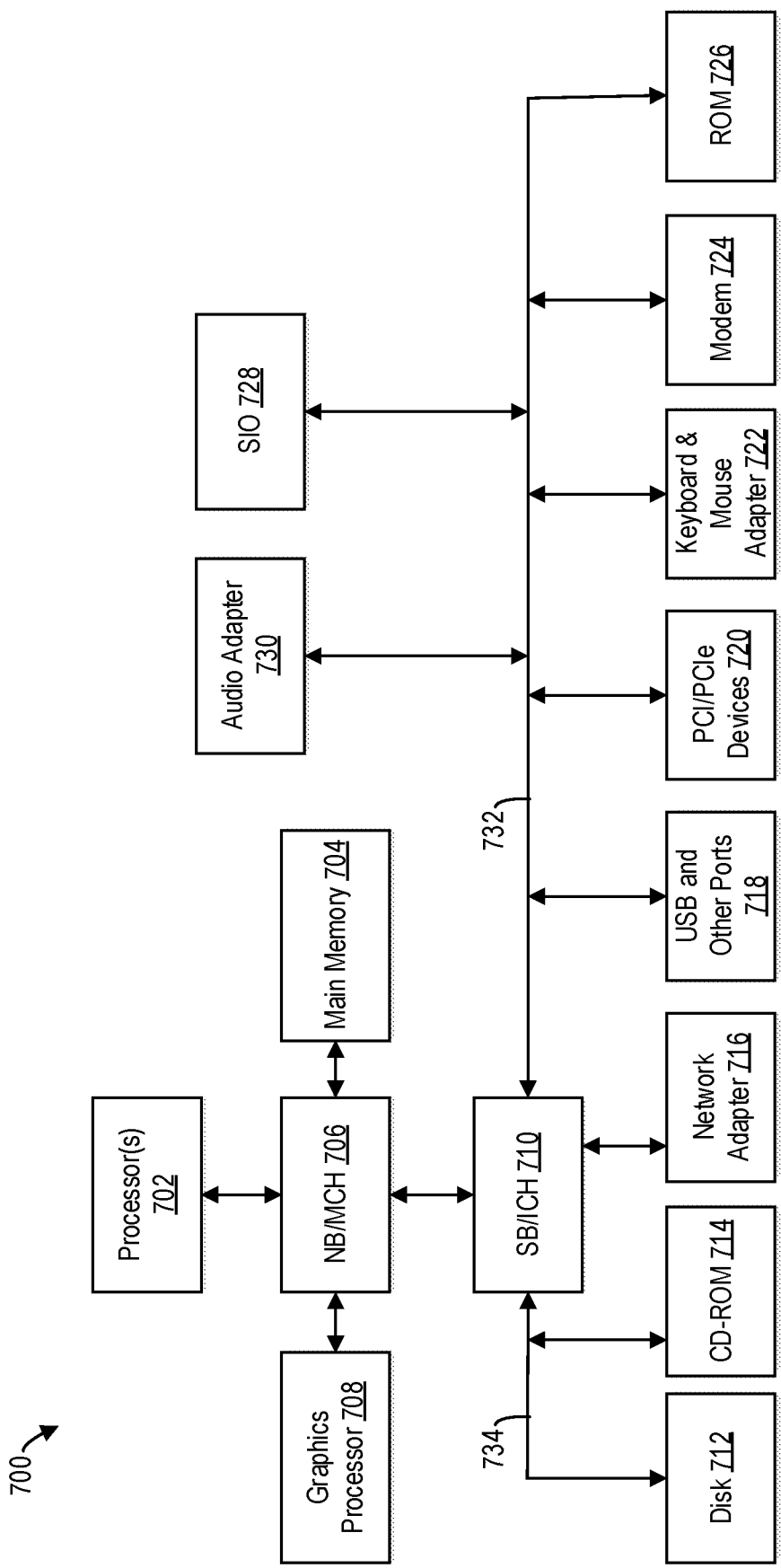
FIG. 7 shows an illustrative block diagram of an example data processing system that can be applied to implement embodiments of the present disclosure.

FIG. 7 is a block diagram of an example data processing system in which aspects of the illustrative embodiments may be implemented. Data processing system 700 is an example of a computer that can be applied to implement the system 100 of FIG. 1, the system 200 of FIG. 2, the system 300 of FIG. 3, or the system 400 of FIG. 4, and in which computer usable code or instructions implementing the processes for illustrative embodiments of the present disclosure may be located. In one illustrative embodiment, FIG. 7 represents a computing device that implements the system 100 of FIG. 1, the system 200 of FIG. 2, the system 300 of FIG. 3, or the system 400 of FIG. 4 augmented to include the additional mechanisms of the illustrative embodiments described hereafter.

In the depicted example, data processing system 700 employs a hub architecture including north bridge and memory controller hub (NB/MCH) 706 and south bridge and input/output (I/O) controller hub (SB/ICH) 710. Processor(s) 702, main memory 704, and graphics processor 708 are connected to NB/MCH 706. Graphics processor 708 may be connected to NB/MCH 706 through an accelerated graphics port (AGP).

In the depicted example, local area network (LAN) adapter 716 connects to SB/ICH 710. Audio adapter 730, keyboard and mouse adapter 722, modem 724, a read only memory (ROM) 726, a hard disk drive (HDD) 712, compact disc read only memory (CD-ROM) drive 714, universal serial bus (USB) ports and other communication ports 718, and peripheral component interconnect/peripheral component interconnect express (PCI/PCIe) devices 720 connect to SB/ICH 710 through bus 732 and bus 734. PCI/PCIe devices may include, for example, Ethernet adapters, add-in cards, and personal computer (PC) cards for notebook computers. PCI uses a card bus controller, while PCIe does not. ROM 726 may be, for example, a flash basic input/output system (BIOS).

HDD 712 and CD-ROM drive 714 connect to SB/ICH 710 through bus 734. HDD 712 and CD-ROM drive 714 may use, for example, an integrated drive electronics (IDE) or serial advanced technology attachment (SATA) interface. Super I/O (SIO) device 728 may be connected to SB/ICH 710.

An operating system runs on processor(s) 702. The operating system coordinates and provides control of various components within the data processing system 700 in FIG. 7. In some embodiments, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 700.

In some embodiments, data processing system 700 may be, for example, an IBM® eServer™ System p® computer system, running the Advanced Interactive Executive (AIX®) operating system or the LINUX® operating system. Data processing system 700 may be a symmetric multiprocessor (SMP) system including a plurality of processors 702. Alternatively, a single processor system may be employed.

Instructions for the operating system, the object-oriented programming system, and applications or programs are located on storage devices, such as HDD 712, and may be loaded into main memory 704 for execution by processor(s) 702. The processes for illustrative embodiments of the present disclosure may be performed by processor(s) 702 using computer usable program code, which may be located in a memory such as, for example, main memory 704, ROM 726, or in one or more peripheral devices 712 and 714, for example.

A bus system, such as bus 732 or bus 734 as shown in FIG. 7, may include one or more buses. The bus system may be implemented using any type of communication fabric or architecture that provides for a transfer of data between different components or devices attached to the fabric or architecture. A communication unit, such as modem 724 or network adapter 716 of FIG. 7, may include one or more devices used to transmit and receive data. A memory may be, for example, main memory 704, ROM 726, or a cache such as found in NB/MCH 706 in FIG. 7.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read only memory (EPROM) or Flash memory, a static random access memory (SRAM), a portable CD-ROM, a digital video disc (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or eternal storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    obtaining fault information regarding a fault associated with a first drone;
    obtaining context parameter data of the first drone;
    determining, by a processor, a test plan based on the fault information, wherein the test plan comprises a plurality of test cases including a first test case and a second test case;
    determining a first risk value associated with the first test case of the test plan using the context parameter data;
    determining a second risk value associated with the second test case of the test plan using the context parameter data;
    comparing the first risk value to the second risk value;
    determining to initiate execution of the first test case of the test plan when the first risk value is less than the second risk value;
    causing the first drone to initiate collection of test data by causing the first drone to initiate execution of the first test case;
    determining, based on the test data, a problem with the first drone to obtain an identified problem with the first drone, wherein the identified problem with the first drone corresponds to a cause of the fault;
    determining a remediation action for the first drone to perform based on the identified problem; and
    causing the first drone to execute the remediation action.

2. The computer-implemented method of claim 1, wherein the context parameter data includes drone traffic in an area in which the first drone is flying.

3. The computer-implemented method of claim 1, wherein the context parameter data includes a current condition of one or more components of the first drone.

4. The computer-implemented method of claim 1, wherein the first risk value is further determined based on results of application of the first test case to one or more second drones.

5. The computer-implemented method of claim 1, wherein the first risk value is determined using known issues associated with the first test case.

6. The computer-implemented method of claim 1, wherein the first risk value is further determined using results of application, to the first drone, of one or more other test cases in the test plan.

7. The computer-implemented method of claim 1, wherein the first test case comprises a test script or a code unit containing test data, and further comprising generating a third test case based on the test data.

8. A system, comprising:
    a fault monitoring system configured to obtain fault information regarding a fault associated with a first drone; and
    a test and debug system coupled to the fault monitoring system and configured to:
        obtain context parameter data of the first drone;
        determine a test plan based on the fault information, wherein the test plan comprises a plurality of test cases including a first test case and a second test case;
        determine a first risk value associated with the first test case of the test plan using the context parameter data;
        determine a second risk value associated with the second test case of the test plan using the context parameter data;
        compare the first risk value to the second risk value;
        determine to initiate execution of the first test case when the first risk value is less than the second risk value;

cause the first drone to collect test data by causing the first drone to initiate execution of the first test case; and determine, based on the test data, a problem with the first drone to obtain an identified problem with the first drone, wherein the identified problem with the first drone corresponds to a cause of the fault; and a remediation action selector configured to:

receive the test data and information indicating the identified problem with the first drone; and determine a remediation action for the first drone to perform using the identified problem with the first drone.

9. The system according to claim 8, wherein the context parameter data includes weather conditions in an area in which the first drone is flying, landscape in the area, wind speed in the area, drone traffic in the area, or a combination thereof.

10. The system according to claim 8, wherein the context parameter data includes a current condition of one or more components of the first drone.

11. The system according to claim 8, wherein the first risk value is further determined based on results of application of the first test case to one or more second drones.

12. The system according to claim 8, further comprising a test case generator configured to generate a third test case based on the test data.

13. The system according to claim 8, wherein the remediation action is determined from a plurality of remediation options.

14. The system according to claim 13, wherein the remediation options include deploying one or more backup drones, rolling back affected software to a previous version of software, pushing a software upgrade, applying a patch, or a combination thereof.

15. A computer program product comprising a computer readable storage medium having program instructions embodied therewith, the program instructions executable by a computer to cause the computer to:

obtain fault information regarding a fault associated with a first drone;

obtain context parameter data of the first drone;

determine, by the computer, a test plan based on the fault information, wherein the test plan comprises a plurality of test cases including a first test case and a second test case;

determine a first risk value associated with the first test case using the context parameter data;

determine a second risk value associated with the second test case using the context parameter data;

compare the first risk value to the second risk value;

determine to initiate execution of the first test case when the first risk value is less than the second risk value;

cause the first drone to initiate collection of test data by causing the first drone to initiate execution of the first test case;

determine, based on the test data, a problem with the first drone to obtain an identified problem with the first drone, wherein the identified problem with the first drone corresponds to a cause of the fault; and determine a remediation action for the first drone to perform based on the identified problem.

16. The computer program product of claim 15, wherein the context parameter data includes weather conditions in an area in which the first drone is flying, landscape in the area, wind speed in the area, drone traffic in the area, or a combination thereof.

17. The computer program product according to claim 15, wherein the context parameter data includes a current condition of one or more components of the first drone.

18. The computer program product according to claim 15, wherein the first risk value is further determined based on results of application of the first test case to one or more second drones.

19. The computer program product according to claim 15, wherein the first risk value is determined using known issues associated with the first test case.

20. The computer program product according to claim 15, wherein the first risk value is further determined using results of application, to the first drone, of one or more other test cases in the test plan.

* * * * *